Patent Number: 5,901,348
Date of Patent: May 4, 1999

United States Patent [19]
Bang et al.

[54] APPARATUS FOR ENHANCING SENSITIVITY IN COMPRESSIVE RECEIVERS AND METHOD FOR THE SAME

[75] Inventors: William R. Bang, Farmingdale; Peter J. Burke, Commack; Joseph S. Levy, Merrick, all of N.Y.

[73] Assignee: AIL Systems, Inc., Deer Park, N.Y.

[21] Appl. No.: 08/782,545

[22] Filed: Jan. 10, 1997

[51] Int. Cl.⁶ .................................................. H04B 1/16
[52] U.S. Cl. ........................................ 455/254; 455/226.1
[58] Field of Search ..................................... 348/725, 731, 348/384, 390; 375/240; 455/254, 296, 303, 305, 72, 226.1, 161.1, 161.2, 280, 338, 146, 147

[56] References Cited

U.S. PATENT DOCUMENTS 4,704,737 11/1987 Estrick et al. ........................... 455/147
5,220,683 6/1993 Rudish .................................... 455/146

*Primary Examiner*—Nguyen Vo
*Attorney, Agent, or Firm*—Hoffmann & Baron, LLP

[57] ABSTRACT

A continuous wave (CW) integrator is employed within a compressive receiver to improve the sensitivity of the compressive receiver to CW signals. The CW integrator circuit partitions the bandwidth of the compressive receiver into a series of contiguous bins and integrates any signals residing within these bins over many sweeps of the compressive receiver bandwidth. By sampling and integrating CW signals present in the compressive receiver bandwidth, the CW integrator circuit improves the sensitivity of the compressive receiver by a factor approximately equal to $10 \log \sqrt{N}$, where N is the number of integrations performed.

10 Claims, 10 Drawing Sheets

APPARATUS FOR ENHANCING SENSITIVITY IN COMPRESSIVE RECEIVERS AND METHOD FOR THE SAME

BACKGROUND OF THE INVENTION

1. Field of the Invention

The present invention relates to compressive receivers, and more particularly relates to a circuit and method for improving the sensitivity to continuous wave (CW) signals presented to a compressive receiver.

2. Description of the Prior Art

Compressive receivers are well known in the prior art. Referring to FIG. 1, the architecture of a traditional compressive receiver (CR) 2 is illustrated in block diagram form. In a CR, a radio frequency (RF) amplifier 4 receives and amplifies a broad band radio signal. Following the RF amplifier 4 is a mixer 6. An output terminal of the RF amplifier 4 is operatively coupled to an RF input port 6A of the mixer 6 which receives the amplifier signal.

The CR also includes a swept local oscillator (SLO) 8 which has an associated output port 8A. The SLO 8 generates a frequency sweep which is linearly changing with time from a first frequency (F1) to a final frequency (F2), over a fixed time period known as the compressive receiver sweep time ($\tau_s$). The SLO is characterized by a slope which is equal to $$\frac{F2-F1}{\tau_s}.$$

The bandwidth of the compressive receiver is equal to the difference in frequencies, F2–F1, and is typically several hundred megahertz wide. The SLO output port 8A is coupled to a local oscillator (LO) input port 6B of the mixer 6.

The mixer 6 further includes an intermediate frequency (IF) output port 6C. The mixer 6 generates an output signal corresponding to the sum and the difference of the signals presented to the RF input port 6A and the LO input port 6B. This mixer output signal is presented on the IF output port 6C.

The compressive receiver further includes a dispersive delay line (DDL) 10 which has both an input terminal and an output terminal. The input terminal of the DDL 10 is operatively coupled to the IF output port 6C and receives the mixer output signal. The DDL 10 exhibits a linear variable frequency delay over the CR bandwidth and generates a time domain output signal which is representative of the frequency domain signal presented to the DDL 10 input terminal. The slope of the linear variable delay of the DDL 10 is equal and opposite to the slope of the SLO 8. Therefore, the slope of DDL 10 can be stated as:

$$-\left(\frac{F2-F1}{\tau_s}\right).$$

As a result of the related slopes of SLO 8 and the DDL 10, the output signal from the DDL 10 is a compressed frequency domain output voltage which corresponds to the radio signal presented to the input terminal 4A of RF amplifier 4.

Following the DDL 10, the compressive receiver includes a detector 11. The detector 11 receives the compressed frequency domain signal and generates a corresponding compressed time domain voltage signal. A conventional detector 11 is formed using a successive detection log amp. The output signal from the detector 11 is the compressive receiver video output signal.

The compressive receiver further includes a center of pulse (COP) detector 12 which has both an input terminal and an output terminal. The input terminal of the COP detector 12 is operatively coupled to the output detector 11 and receives the CR video output signal. The COP detector 12 determines when carrier signals are present in the compressive receiver video output signal and generates a strobe signal corresponding to these carrier signals. Following the COP detector 12 is a frequency/amplitude encoder 14 which has both input and output terminals. The input terminal of the frequency/amplitude encoder 14 is operatively coupled to the output terminal of the COP detector 12. The frequency/amplitude encoder 14 receives the strobe signals from the COP detector 12 and measures the relative time of the strobe signals to determine the actual frequency of the carrier signals. The frequency/amplitude encoder 14 also evaluates the magnitude of the CR video output signal and calculates the equivalent RF power of this signal. The frequency/amplitude encoder 14 creates a digital signal corresponding to the frequency and amplitude of received carrier signals and presents this digital signal on its output terminal.

The CR also includes a signal track and control circuit 16. The signal track and control circuit 16 includes an input terminal which is operatively coupled to the output terminal of the frequency/amplitude encoder 14. The signal track and control circuit 16 receives the frequency and amplitude data from the frequency/amplitude encoder 14 for each sweep of the CR bandwidth and averages this data. The signal track and control circuit 16 also measures the pulse width and time of arrival of the CR video output signal to determine an end of pulse condition. The signal track and control circuit 16 further includes an output terminal which is operatively coupled to a pulse formatter 18. Once the end of pulse condition has been determined, the signal track and control circuit 16 forwards the frequency, amplitude, pulse width and time of arrival data to the pulse formatter 18.

The pulse formatter 18 further includes a pulse descriptor word (PDW) output port 18a. The pulse formatter 18 formats the data signals from the signal track and control circuit 16 and generates a pulse descriptor word output signal which is presented on the PDW output port 18a.

While such a compressive receiver topology features a significantly higher sensitivity for the given bandwidth as compared to traditional receiving systems, there is still a need to further improve the small signal detection performance of CW signals presented to the input of compressive receiver systems.

OBJECTS AND SUMMARY OF THE INVENTION

It is an object of the present invention to provide a circuit which improves the sensitivity of compressive receivers for continuous wave (CW) signals.

It is another object of the present invention to provide a circuit which averages the video output signal from a compressive receiver over a time interval to improve the detector sensitivity of a compressive receiver for CW signals.

It is a further object of the present invention to provide a circuit which averages the video signals from a compressive receiver using standard, commercially available, digital technology.

It is yet a further object of the present invention to provide a method to improve the sensitivity of compressive receivers.

It is still a further object of the present invention to provide a method to improve the sensitivity of compressive receivers by partitioning the bandwidth of the compressive receiver and time averaging the signals within those partitions.

In accordance with one form of the present invention, a compressive receiver, such as described previously, includes a CW integrator circuit. The CW integrator circuit receives signals from the video output of the compressive receiver. The CW integrator circuit partitions the video bandwidth of the CR into a series of continuous, discrete, frequency segments or bins, and averages the value of each of these bins over a period of time. From these averages, the CW integrator generates an output signal which will be received by the pulse formatter of the compressive receiver.

Conventional CR systems have no supplemental circuitry or processes to achieve improved detection sensitivity of CW signals within the CR bandwidth. By integrating the video output of the CR over several sequential scans of the CR bandwidth, a signal to noise improvement for CW signals can be achieved. The magnitude of the improvement is approximately equal to the $\sqrt{N}$, where N is the number of integrations performed on the bandwidth.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
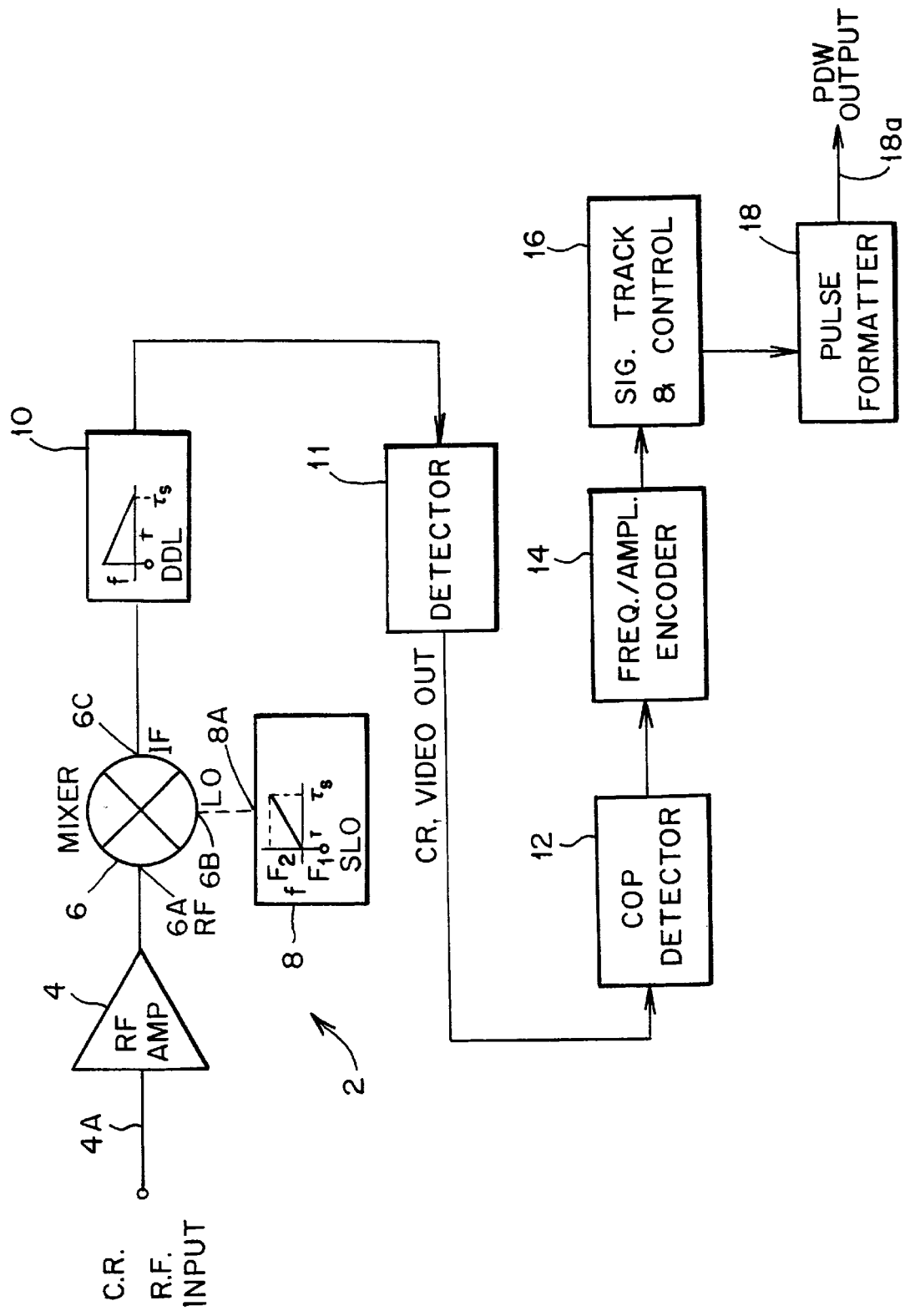
FIG. 1 is a block diagram of a compressive receiver known in the prior art.
Figure 2:
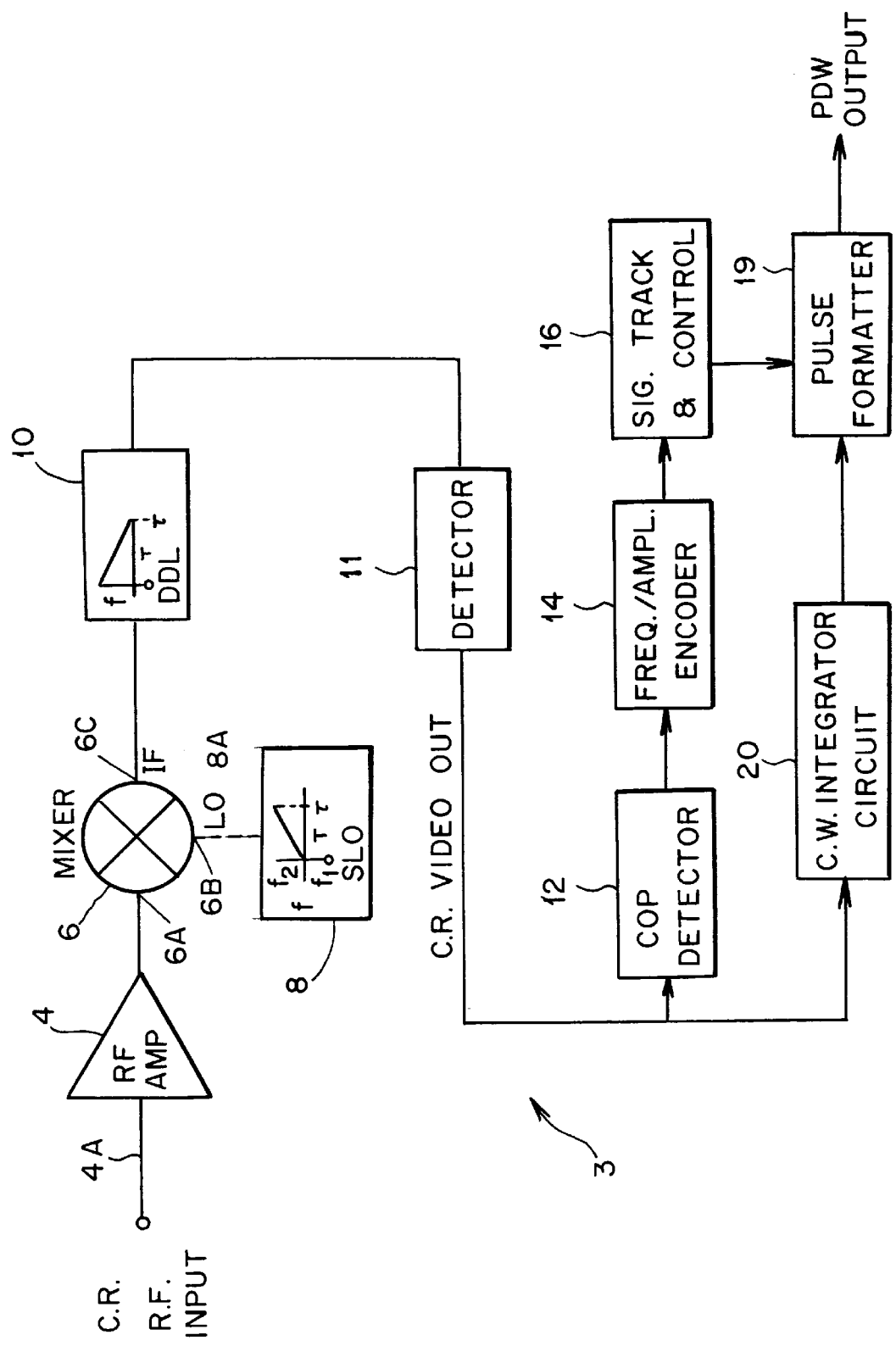
FIG. 2 is a block diagram of a compressive receiver including a CW integrator circuit formed in accordance with the present invention.

Initially referring to FIG. 2, a compressive receiver (CR) 3, including a CW integrator circuit 20 and formed in accordance with the present invention, is shown. The compressiver receiver 3 of the present invention includes the components described previously and shown in FIG. 1, as well as a CW integrator circuit 20. The CW integrator circuit 20 is interposed between the detector 11 and the pulse formatter 19 of the CR 3. The CW integrator circuit 20 receives the CR video output signal and averages this signal over time. The CW integrator circuit 20 generates a pulse-descriptor word (PDW) corresponding to the averaged energy of the radio signal within the CR bandwidth and presents this word to the pulse formatter 19.

The pulse formatter 19 of the present invention performs the same function as the pulse formatter 18 previously described in a conventional CR. Additionally, the pulse formatter 19 receives frequency and amplitude data from the CW integrator circuit 20. The pulse formatter merges the data from both the signal track and control circuit 16 and the CW integrator 20 to form the PDW output signal.

Figure 3:
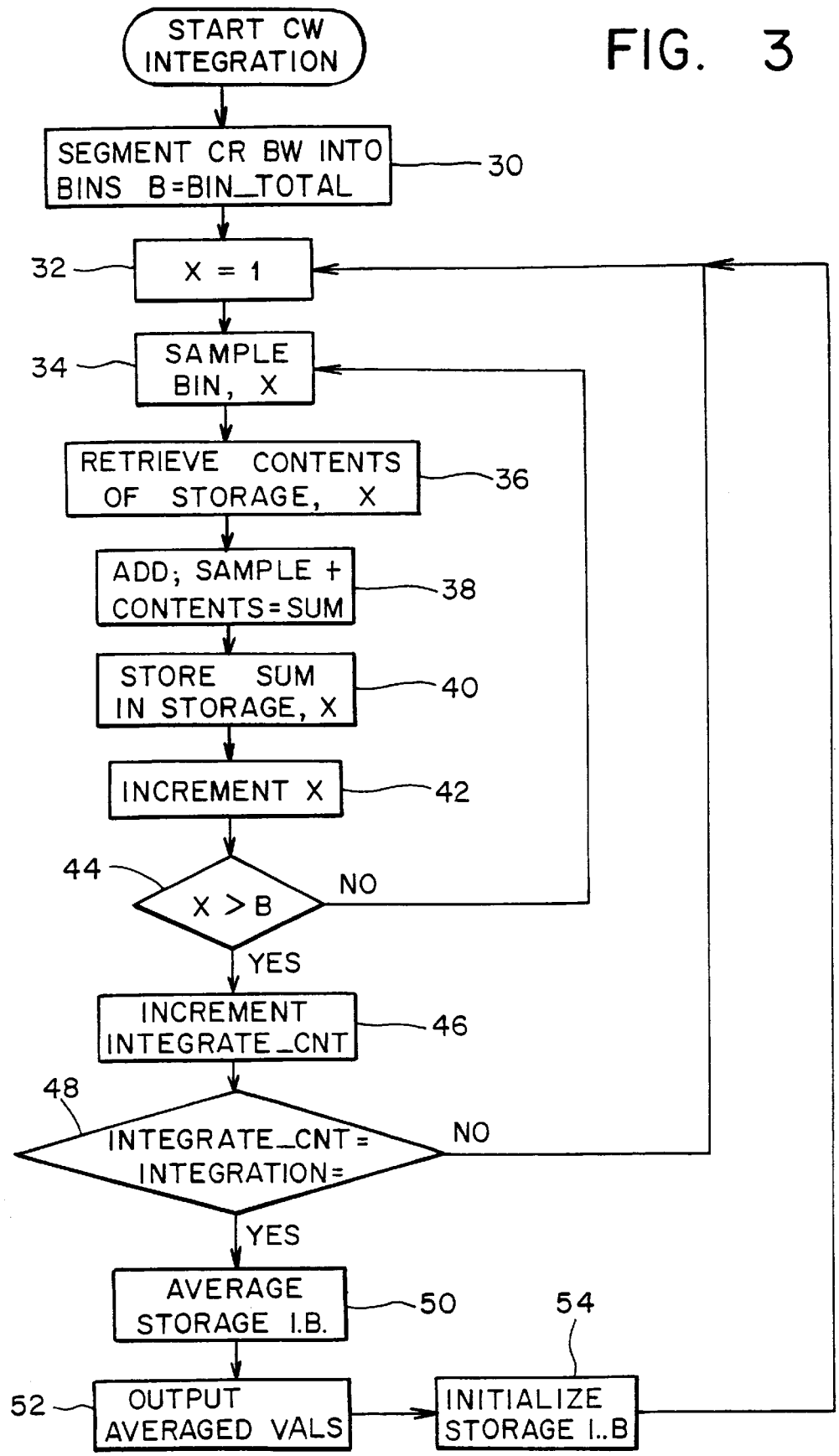
FIG. 3 is a flow chart illustrating the operation of a CW integrator circuit in accordance with the present invention.

The operation of the CW integrator circuit 20 is illustrated in the flow chart of FIG. 3. Prior to performing the sequential steps involved in the time averaging (integration) process, the CR bandwidth must be divided into a fixed number of subdivisions or bins (Block 30). Each bin corresponding to a specific time-segment of the CR video output signal. The total number of bins, B, selected for a particular application is the result of a design tradeoff between frequency resolution, and the time required to fully average the CR bandwidth (integration time). Increased frequency resolution requires a larger number of bins within a given bandwidth and results in proportionally higher integration time.

After the CR bandwidth has been partitioned into bins, an integration scan begins by setting a bin index, X, to 1. This selects the first bin (Block 32) in the CR bandwidth. Voltage from the CR video output signal within this first bin is then digitally sampled (Block 34). During a time which is preferably substantially contemporaneous with the first bin being sampled, a storage location corresponding to the first bin is selected and a value stored in the location is retrieved (Block 36). The current sample from Block 34 is then added to the contents of the selected storage location (Block 38). The sum resulting from this addition is then stored back in the selected storage location, replacing the prior value (Block 40). If this is the first sampling of the first bin (first integration scan), the storage location contents will be zero. However, if the bin has been previously sampled, the storage location will contain an accumulated value that is the result of a sequence of recursive additions.

After the sum is stored (Block 40), the bin index is incremented to select the next bin (Block 42). The bin index is then tested to determine if all of the bins have been sampled (Block 44). If all bins have not been sampled (X≦B), Blocks 34–44 are repeated. When X<B, indicating that the integration scan is complete, an integration counter is incremented (Block 46). The integration counter is then tested to determine if a predetermined number of integration scans have been performed (Block 48).

The predetermined number of integration scans selected is not critical. The selection of this parameter, however, requires a design tradeoff between the total time available for averaging the CR bandwidth, and the sensitivity improvement desired in the compressive receiver. The sensitivity of the compressive receiver is improved by increasing the signal to noise ratio of the signals in the bins. This is achieved because the noise in the bins is a random, and experiences a reduction in peak magnitude when averaged. At the same time, CW signals will maintain their magnitude when averaged over several bin samples.

Figure 7:
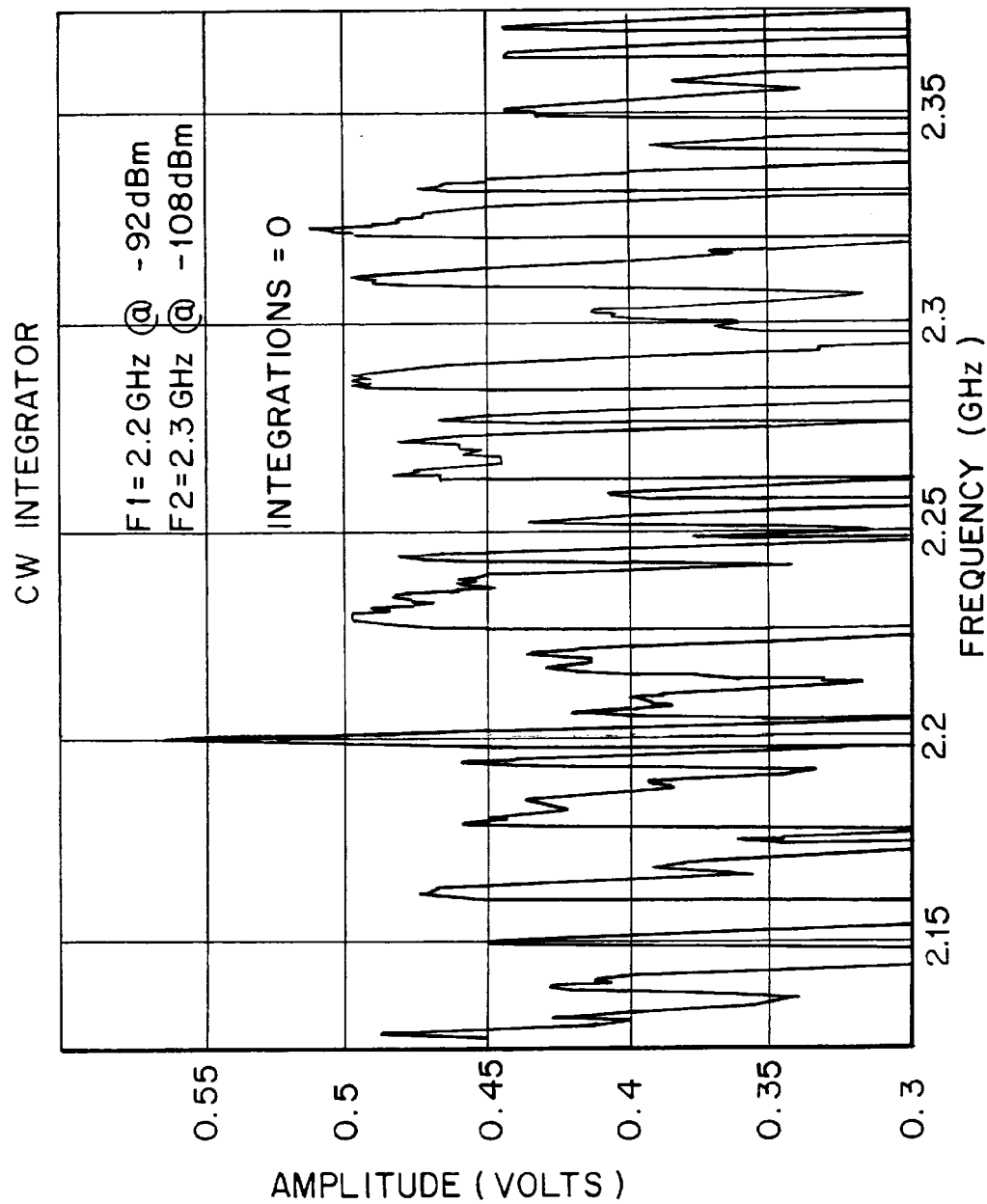
FIGS. 7–10 are post integration measured data graphs of signals within a compressive receiver bandwidth with different integration counts applied.
Figure 8:
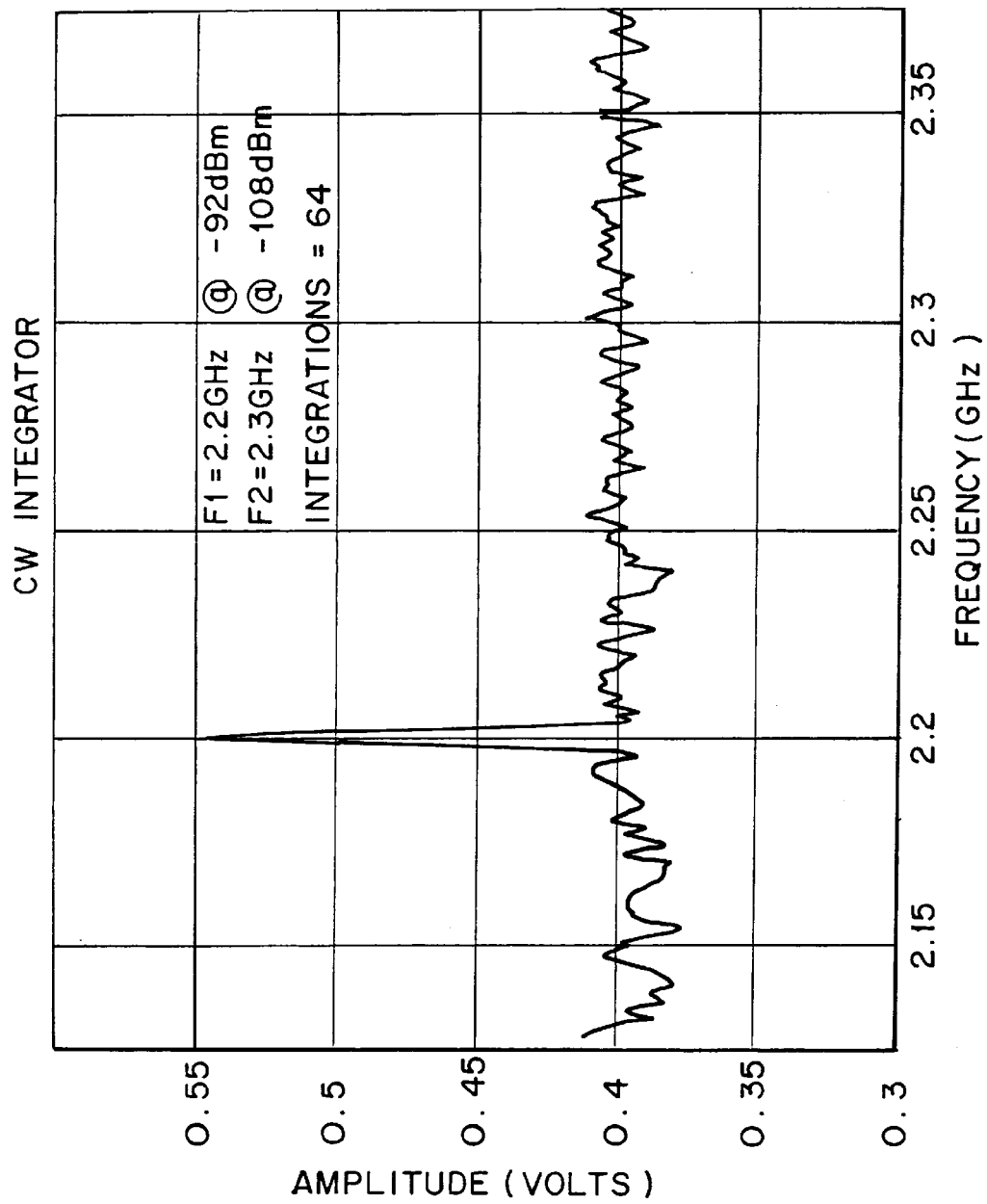
Figure 9:
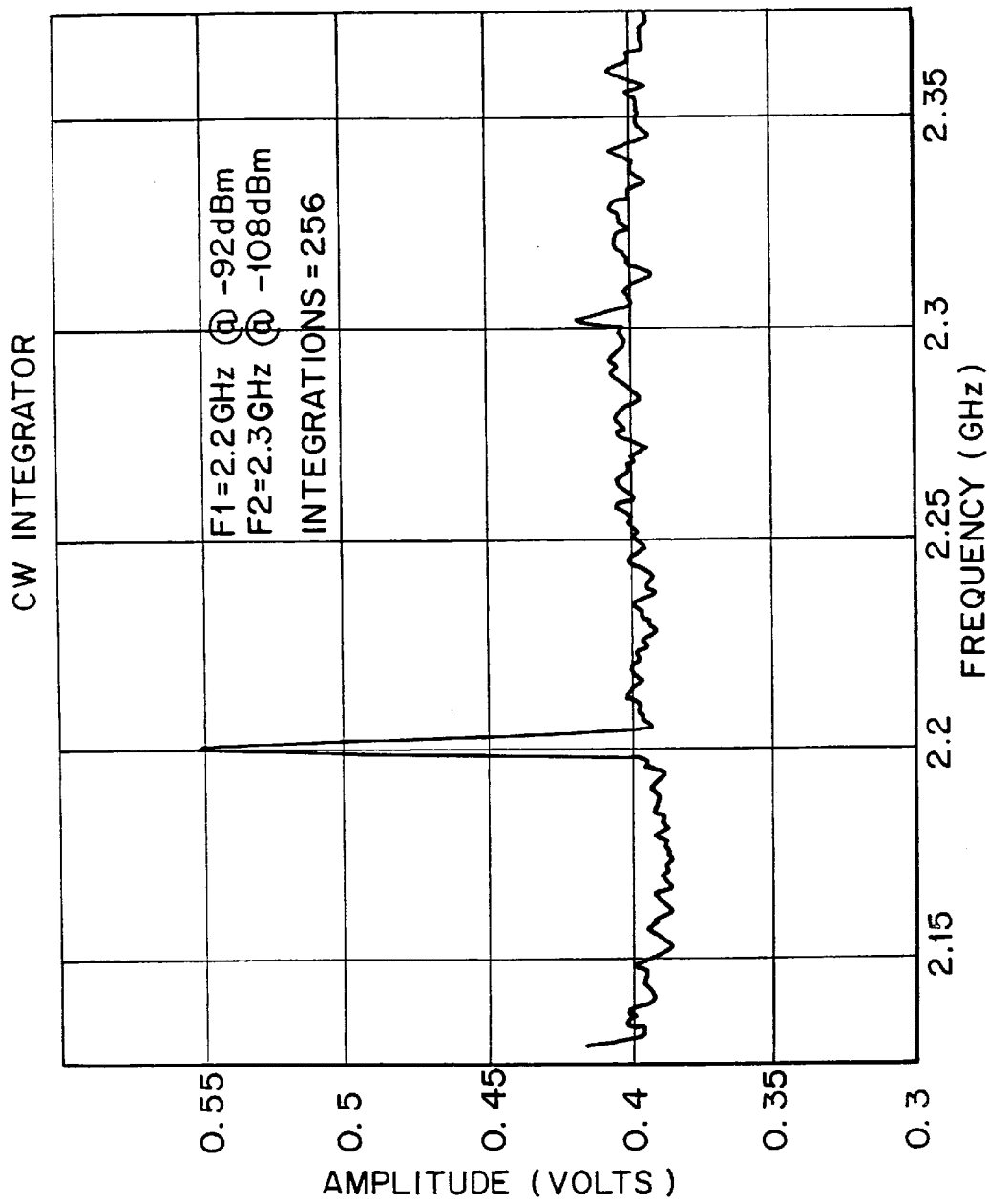
Figure 10:
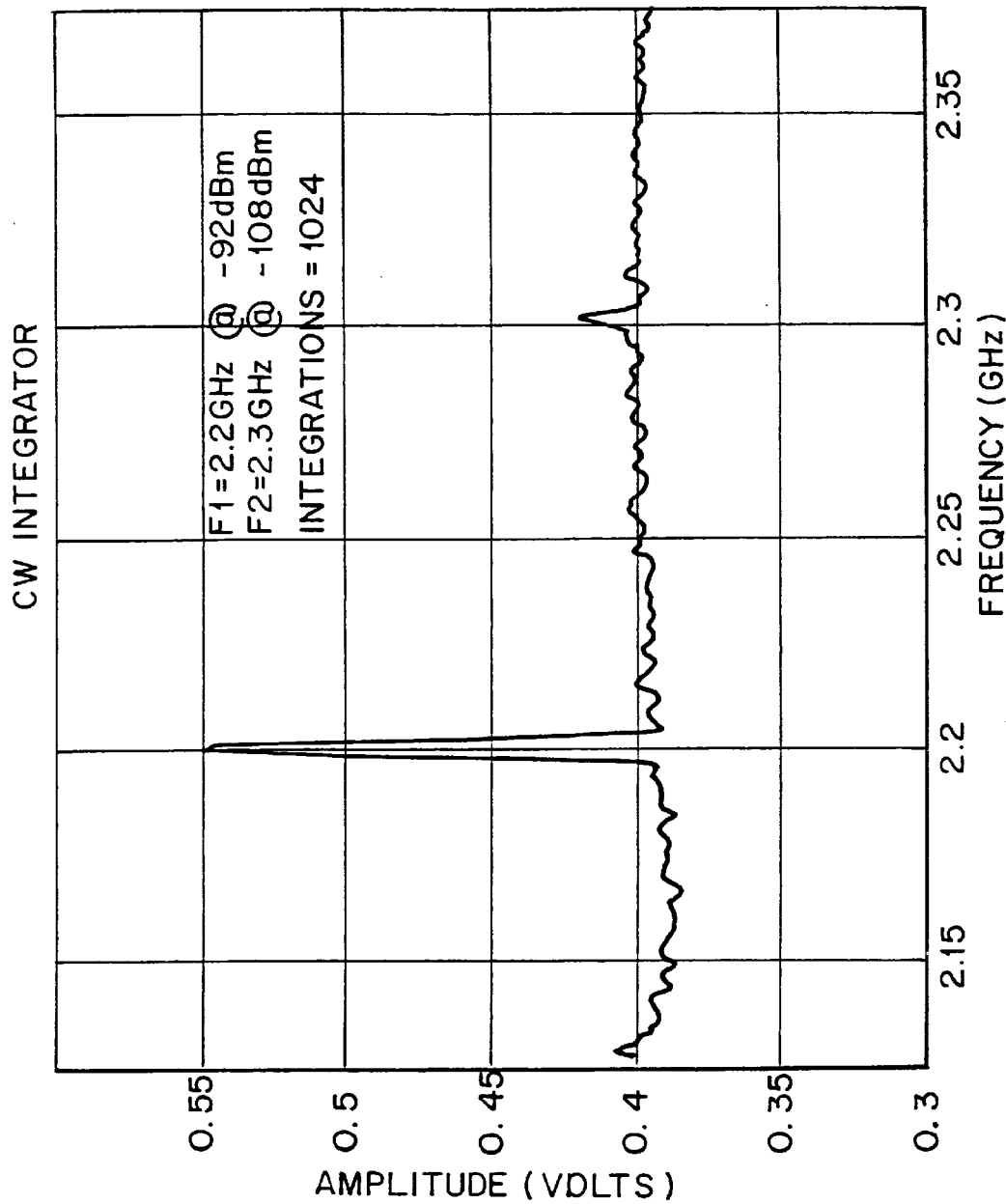

The sensitivity improvement, in dB, is approximately given by:

$$10 \log \sqrt{N}$$

where N is the predetermined number of integration scans performed. The improvement in signal to noise ratio is illustrated in the computer simulated graphs of the compressiver receiver bandwidth shown in FIGS. 7 through 10. FIG. 7 illustrates the compressive receiver bandwidth with no integrations performed. In FIGS. 8, 9 and 10, integration scans totalling 64, 256 and 1024 integrations respectively, are applied to the CR bandwidth. As these figures illustrate, with increasing integration, the noise is suppressed and the two CW signals are emphasized.

The time required for the integration cycle is given by:

$$T=B\tau_B N.$$

where B is the number of bins and $\tau_B$ is the sampling time per bin. As this equation shows, the integration time is directly proportional to the number of scans, N. Therefore, N must be selected to provide a balance between integration time and signal to noise ratio improvement.

Returning to FIG. 3, if the predetermined number of scans, N, has been reached, the values of storage locations 1 through B will each be averaged (Block 52). The averaging function is performed by dividing the accumulated values in each of the B storage locations by N. An output signal will then be generated corresponding to the averaged values within each of the bins (Block 52). The values in storage locations 1 through B will then be initialized to zero (Block 54) and the integration process will be repeated from Block 32.

If circuitry is available with sufficient sampling and processing speed at a suitable cost, a full integration scan may be performed in "real time" within a single sweep of the CR bandwidth ($\tau_{B=}\tau_{s/B}$) For example, in a compressive receiver with a 500 ns sweeptime, a bandwidth of 500 MHz, and a bin resolution of 1 MHZ, the bin sampling rate required for "real-time" integration is 1 ns/bin.

An alternative embodiment, which reduces the required sampling speed, and associated cost, is to sample a single bin per CR sweep. In this embodiment $\tau_{B=}\tau_s$. Using the CR parameters stated above as an example, it will take 500 sweeps of the compressive receiver to sample each bin of the CR once. The available bin sampling time is thereby increased to 500 ns. This longer sampling time is more readily achievable with standard digital devices.

It will be appreciated by those skilled in the art that $\tau_B$ may also take the form of synchronous sub-multiples of $\tau_s$ where multiple bins are sampled during the CR scan time to improve the averaging time of the CW integrator 20. This can be stated by the equation:

$$\tau_B = \frac{\tau_s}{y}$$

where y is an integer defined as $$2 \leq y \leq B.$$

Figure 4:
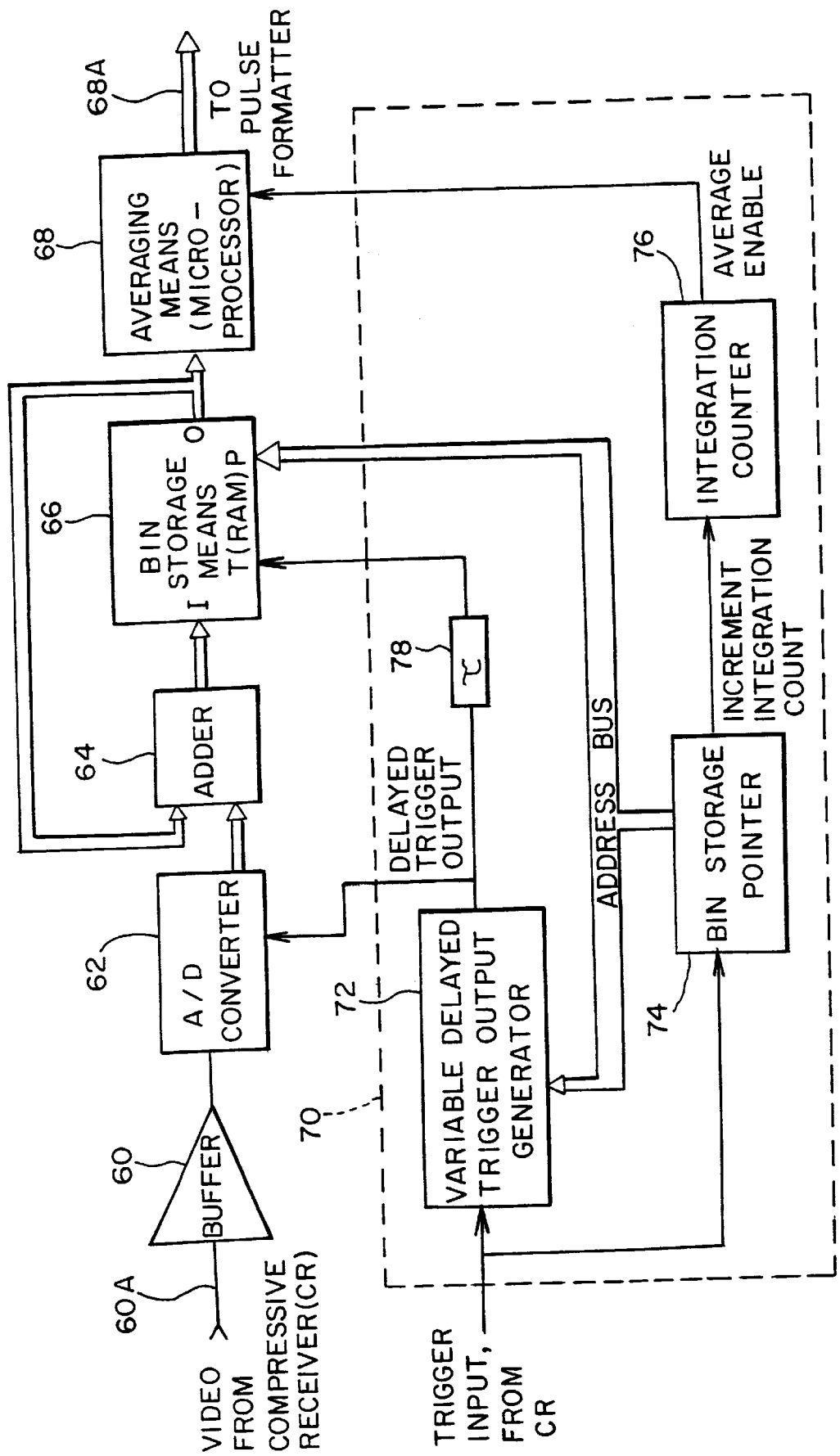
FIG. 4 is a block diagram of a CW integrator circuit formed in accordance with the present invention.

A CW integrator circuit for performing the steps illustrated in FIG. 3 is shown in block diagram form in FIG. 4. The previously described sampling (Block 34, FIG. 3) is performed by an analog to digital (A/D) converter 62, such as an Analog Devices integrated circuit. The A/D converter 62 has an analog input terminal, a digital output port, and a sampling trigger input terminal. The analog input terminal of the A/D converter 62 receives the CR video output signal from the detector 11 (FIG. 1) and converts this to an equivalent digital sampled signal. This digital signal is presented on the digital output port of the A/D converter 62 in response to an initiation signal received on the sampling trigger input terminal. In a preferred embodiment, a buffer amplifier 60 will be interposed between the detector 11 of the compressive receiver and the input terminal of the A/D converter 62.

The CW integrator circuit 20 further includes an adder circuit 64 having first and second input ports and an output port. The first adder input port is operatively coupled to the output port of the A/D converter 62 and receives the digital sampled video signal. The CW integrator circuit 20 also includes bin storage means 66 having a data input port (I), a data output port (O), a bin storage pointer input port (P) and a storage trigger input terminal (T). The output port of adder circuit 64 is operatively coupled to the data input port of bin storage means 66. The bin storage means data output port is operatively coupled back to the second input port of the adder circuit 64 thereby forming a regressive addition circuit path.

Figure 5:
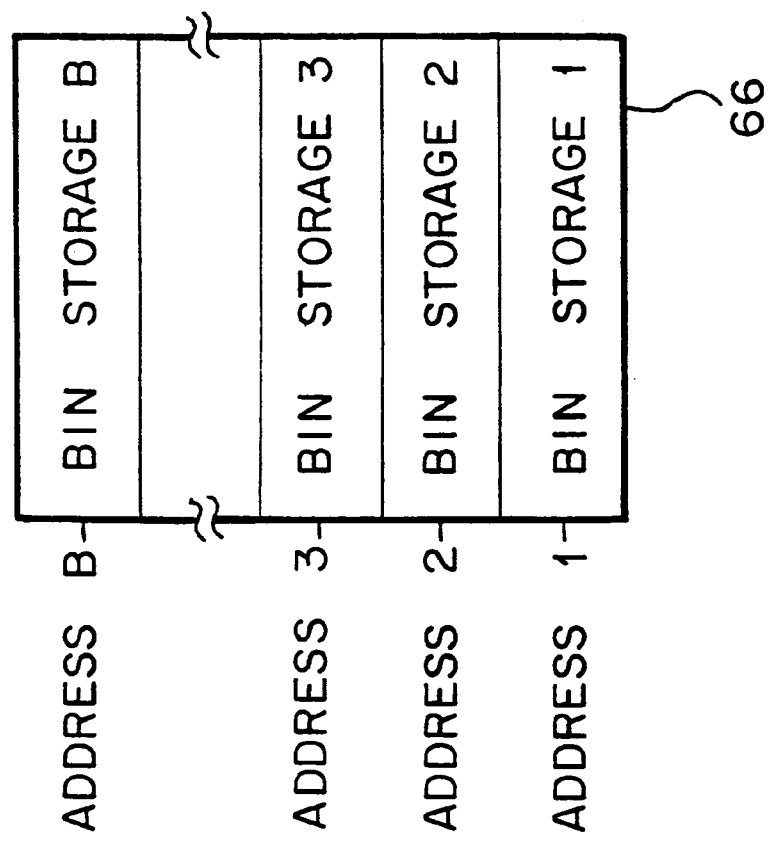
FIG. 5 is a functional block diagram of the bin storage means used in the present invention.

The bin storage means 66 further contains a number of discrete storage locations equal to the total number of bins, B, as defined in Block 30 (FIG. 3). Each storage location has an associated address value as is illustrated in FIG. 5. A specific location is selected by applying the corresponding address value to the bin storage pointer input port. In a preferred embodiment, the bin storage means is a random access memory (RAM). However, other forms of read/write memory may also be utilized for this purpose such as magnetic tape, magnetic disk, and optical read/write media.

The CW integrator circuit 20 further includes an averaging circuit 68. The averaging circuit 68 includes an input port which is operatively coupled to the data output port of the bin storage means 66. The averaging circuit 68 performs a mathematical average on the values within the storage locations of the bin storage means 66 in response to a received average enable signal. In a preferred embodiment of the CW integrator circuit 20, the averaging circuit 68 is a microprocessor, such as Texas Instruments TMS 320C20. However, it will be appreciated by those skilled in the art that this function could also be performed by discrete digital logic, a digital ASIC, a personal computer platform or other mathematical processing elements.

Figure 6:
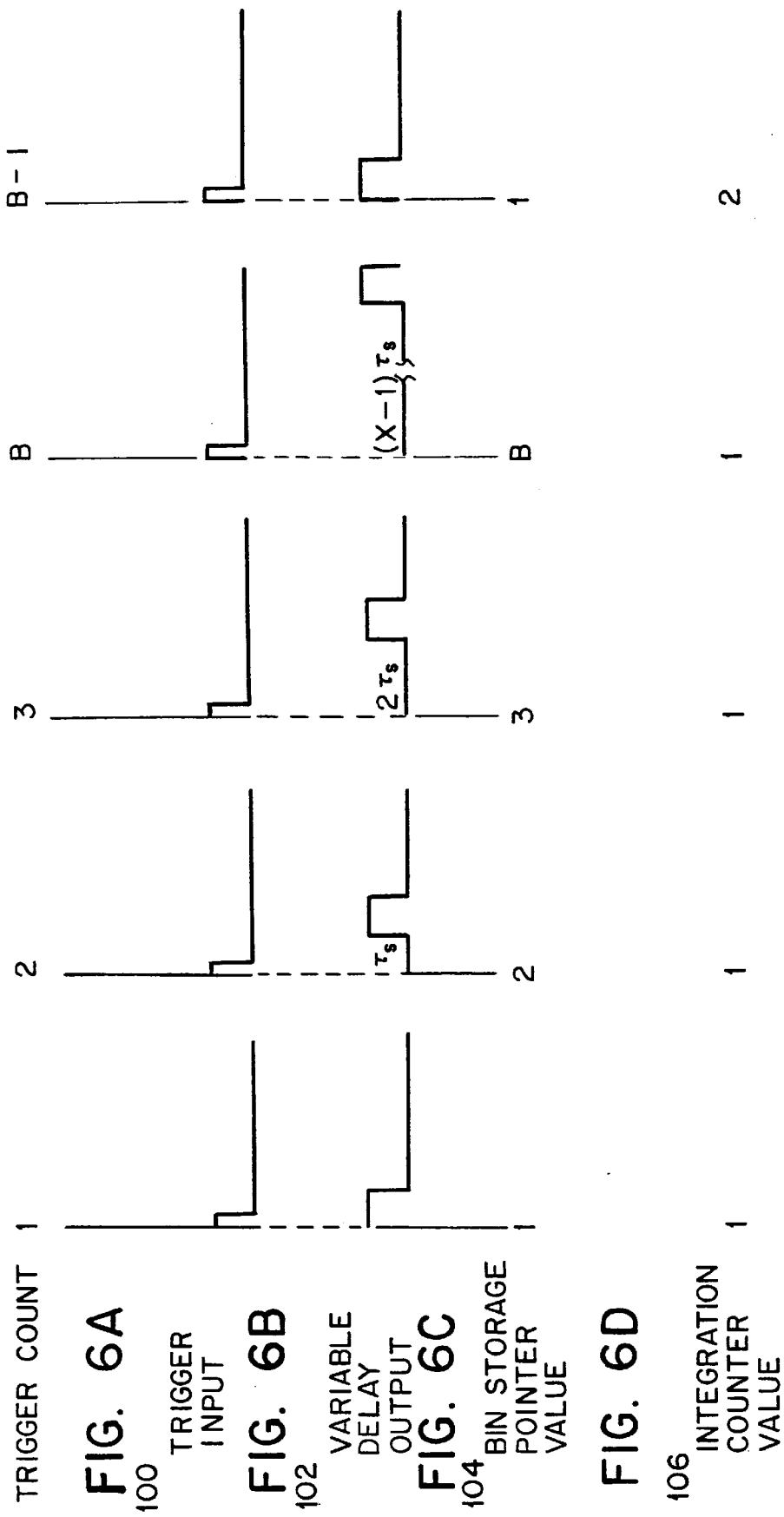
FIG. 6A–6D are timing diagrams and values of signals associated with a CW integrator circuit formed in accordance with the present invention.

The operation of each of the A/D converter 62, adder circuit 64, bin storage means 66 and averaging circuit 68 is controlled and synchronized by timing signals from a timing unit 70. The timing signals generated by the timing unit 70 are illustrated in FIG. 6. The timing unit 70 has a trigger input terminal operatively coupled to the CR 2 (FIG. 1). The trigger input terminal receives a trigger input signal 100 from the CR 2 which synchronizes the operation of the CW integrator circuit 20 to the beginning of each CR sweep. The timing unit 70 also includes a variable delayed trigger output signal generator 72 having an output terminal and an output signal 102 associated therewith. The output signal 102 on the output terminal of the variable delayed trigger output signal generator is a delayed form of the trigger input signal 100. The delay applied to output signal 102 is equal to $M \cdot \tau_B$, where M is the number of trigger input signals 100 received, and $\tau_B$ is the time required to sample each bin. The delayed triggered output terminal is electrically coupled to the sampling trigger input terminal of the A/D converter 62. The A/D converter 62 is responsive to the output signal 102 and initiates sampling when this signal is received.

A fixed time delay element 78 is interposed between the delayed trigger output generator 72 and the storage trigger input terminal of the bin storage means 66. The delay time of the fixed time delay element 78 is equal to the propagation delay within the A/D converter 62 and the adder circuit 64. The delay element 78 insures that the output signal 102 from the delayed trigger output signal generator 72 is received by the bin storage means 66 only after sufficient time has elapsed to allow the A/D converter 62 to perform a sample and have the results of this sample processed by the adder circuit 64.

The timing unit 70 further includes a bin storage pointer 74 having an address bus and an increment integration output terminal. The address bus has an associated digital signal, the bin storage pointer signal 104, which is equivalent to the bin index, X, from FIG. 3. The bin storage pointer signal 104 is incremented for each trigger input signal 100 received from the compressive receiver up to a maximum value of B (Block 42, FIG. 3). When the value of the bin storage pointer signal 104 is equal to B, and a subsequent trigger input signal 100 is received, the bin storage pointer signal 104 is reset to 1. At this time, a signal is also presented on the increment integration output terminal indicating that an integration scan is complete (Block 44, FIG. 3). The address bus of the bin storage pointer 74 is electrically coupled to the bin storage pointer input port of the bin storage means 66. The value of the bin storage pointer signal selects one of the B storage locations within the bin storage means 66. The address bus is also coupled to the delayed trigger signal generator 72, and provides the value, X, which selects the magnitude of delay in the delayed output signal 102.

The timing unit 70 further includes an integration counter 76 having an input terminal and an average enable output terminal. The integration counter 76 contains a value 106 equal to the number of integration scans which have been completed. The input terminal of the integration counter 76 is electrically connected to the increment integration output terminal of the bin storage pointer 74 and receives an increment integration output signal when an integration scan is completed. In response to the increment integration signal, the value 106 of the integration counter 76 is incremented (Block 46, FIG. 3).

When the integration counter 76 reaches a value equal to the predetermined number of integration scans, N, the average enable signal will be generated by the integration counter 76 and presented on the average enable output terminal (Block 48, FIG. 3). The average enable signal is operatively coupled to the averaging means and indicates that the predetermined number of integration scans have been performed. The averaging means is responsive to this signal and performs an averaging function on the contents of the bin storage means 66 (Block 50, FIG. 3). After the successive bins in the bin storage device have been averaged, the averaged values from the averaging means 68 will be presented to the pulse-formatter circuit 19 (Block 52, FIG. 3). The pulse formatter 19 merges the averaged values with the data from the signal track and control circuit 16 and generates a pulse descriptor word describing the frequency and amplitude of signals within the CR bandwidth. After the averaging means outputs these values, the locations of the bin storage means 66 will be initialized to zero and the cycle will repeat (Block 54, FIG. 3).

It will be appreciated by those skilled in the art that a compressive receiver having a CW integrator formed in accordance with the present invention will feature improved detection sensitivity to CW signals. The magnitude of this improvement, in dB, is approximately stated as $10 \log \sqrt{N}$, where N is the number of integration scans performed. This improved sensitivity is achieved through the use of relatively low cost, and readily available, digital logic devices implementing the method of the present invention.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A continuous wave (CW) integrator circuit for improving the sensitivity of a compressive receiver, the CW integrator circuit averaging a received analog video signal generated by the compressive receiver in response to a received synchronization signal generated by the compressive receiver, the analog video signal representing signals within a bandwidth of the compressive receiver and the synchronization signal indicating that a sweep of the bandwidth has begun, the CW integrator circuit comprising:

sampling means, the sampling means receiving the analog video signal from the compressive receiver and generating a digital sampled signal representing the analog video signal in response to a received initiation signal;

adding means, the adding means comprising first and second input ports and an output port, the first input port being operatively coupled to the sampling means and receiving the digital sampled signal therefrom, the adding means generating a signal on the output port representing the sum of signals presented to each of the first and second input ports;

storage means, the storage means comprising an input port, an output port, an address port and a plurality of storage locations, each of the plurality of storage locations being individually selectable by an address signal received by the address port, each of the plurality of storage locations containing a value representing the magnitude of signals in a segment of the bandwidth of the compressive receiver, the storage means input port being operatively coupled to the output port of the adding means, the output port of the storage means being operatively coupled to the second input port of the adding means, whereby a past value contained in a selected storage location is presented to the adding means and a new value, equal to the sum of the past value and digital sampled signal, is stored into the selected storage location replacing the past value;

averaging means, the averaging means being operatively coupled to the output port of the storage means, the averaging means performing a mathematical averaging function on the value stored within of each of the storage locations in response to a received average enable signal; and timing means, the timing means being operatively coupled to each of the compressive receiver, the sampling means, the storage means, and the averaging means, the timing means receiving the synchronization signal from the compressive receiver and generating each of the initiation signal received by the sampling means, the address signal received by the storage means and the average enable signal received by the averaging means in response to the synchronization signal, whereby the functions of sampling, adding, storing, and averaging are performed to improve the sensitivity of the compressive receiver.

2. A CW integrator circuit, as defined by claim 1, wherein the timing means further comprises:

a variable delay generator generating a delay time, the variable delay generator comprising a trigger input terminal, an address input bus, and a delayed trigger output terminal, the trigger input terminal being operatively coupled to the compressive receiver and receiving the synchronization signal therefrom, the variable delay generator regenerating the received synchronization signal on the delayed trigger output terminal after the delay time has expired, the magnitude of the delay time corresponding to an address signal on the address input bus;

a bin storage pointer, the bin storage pointer comprising a trigger input terminal, an address output bus, and an increment integration output terminal, the trigger input terminal being operatively coupled to the compressive receiver to receive the synchronization signal therefrom, the bin storage pointer generating each of the address signal presented on the address output bus and an increment integration signal presented on the increment integration output terminal in response to the received synchronization signal, the address signal being incremented for each received synchronization signal, the address output bus being electrically coupled to each of the address input bus of the variable delay generator and the address port of the storage means whereby the delay time from the variable delay generator corresponds to a selected storage location; and an integration counter, the integration counter having an input terminal, the input terminal being operatively coupled to the increment integration output terminal of the bin storage pointer and receiving the increment integration signal therefrom, the integration counter having an output terminal operatively coupled to the averaging means, the integration counter being responsive to the increment integration signal and generating the average enable signal which is presented on the output terminal after a predetermined number of increment integration signals have been received.

3. A CW integrator circuit, as defined by claim 2, wherein the sampling means comprises an analog to digital convertor, the storage means comprises a random access memory circuit and the averaging means comprises a microprocessor.

4. A compressive receiver circuit operating over a predefined bandwidth, the bandwidth being further defined by a plurality of bandwidth segments, the compressive receiver circuit generating both an analog video output signal representing signals present within the bandwidth and a synchronization signal indicating the beginning of a sweep of the bandwidth, the compressive receiver circuit including a CW integrator circuit to improve the sensitivity of the compressive receiver to CW signals, the CW integrator circuit comprising:

sampling means, the sampling means receiving the analog video signal from the compressive receiver and generating a digital sampled signal representing the analog video signal in response to a received initiation signal;

adding means, the adding means comprising first and second input ports and an output port, the first input port being operatively coupled to the sampling means and receiving the digital sampled signal therefrom, the adding means generating a signal on the output port representing the sum of signals presented to each of the first and second input ports;

storage means, the storage means comprising an input port, an output port, an address port and a plurality of storage locations, each of the plurality of storage locations being individually selectable by an address signal received by the address port, each of the plurality of storage locations containing a value representing the magnitude of signals in each of the plurality of bandwidth segments of the compressive receiver, the storage means input port being operatively coupled to the output port of the adding means, the output port of the storage means being operatively coupled to the second input port of the adding means, whereby a past value contained in a selected storage location is presented to the adding means and a new value, equal to the sum of the past value and digital sampled signal, is stored into the selected storage location replacing the past value;

averaging means, the averaging means being operatively coupled to the output port of the storage means, the averaging means performing a mathematical averaging function on the value stored within of each of the storage locations in response to a received average enable signal; and timing means, the timing means being operatively coupled to each of the compressive receiver, the sampling means, the storage means, and the averaging means, the timing means receiving the synchronization signal from the compressive receiver and generating each of the initiation signal received by the sampling means, the address signal received by the storage means and the average enable signal received by the averaging means in response to the synchronization signal, whereby the functions of sampling, adding, storing, and averaging are performed to improve the sensitivity of the compressive receiver.

5. A compressive receiver circuit, as defined by claim 4, wherein the timing means further comprises:

a variable delay generator generating a delay time, the variable delay generator comprising a trigger input terminal, an address input bus, and a delayed trigger output terminal, the trigger input terminal being operatively coupled to the compressive receiver and receiving the synchronization signal therefrom, the variable delay generator regenerating the received synchronization signal on the delayed trigger output terminal after the delay time has expired, the magnitude of the delay time corresponding to an address signal on the address input bus;

a bin storage pointer, the bin storage pointer comprising a trigger input terminal, an address output bus, and an increment integration output terminal, the trigger input terminal being operatively coupled to the compressive receiver to receive the synchronization signal therefrom, the bin storage pointer generating each of the address signal presented on the address output bus and an increment integration signal presented on the increment integration output terminal in response to the received synchronization signal, the address signal being incremented for each received synchronization signal, the address output bus being electrically coupled to each of the address input bus of the variable delay generator and the address port of the storage means whereby the delay time from the variable delay generator corresponds to a selected storage location; and an integration counter, the integration counter having an input terminal, the input terminal being operatively coupled to the increment integration output terminal of the bin storage pointer and receiving the increment integration signal therefrom, the integration counter having an output terminal operatively coupled to the averaging means, the integration counter being responsive to the increment integration signal and generating the average enable signal which is presented on the output terminal after a predetermined number of increment integration signals have been received.

6. A compressive receiver circuit, as defined by claim 5, wherein the sampling means comprises an analog to digital convertor, the storage means comprises a random access memory circuit, and the averaging means comprises a microprocessor.

7. A method of improving the sensitivity of a compressive receiver to CW signals within a compressive receiver bandwidth, the method comprising the steps of:
   a. mapping the compressive receiver bandwidth into a plurality of contiguous, discrete bins B;
   b. performing an integration scan by sequentially sampling the energy in each of the bins, thereby generating samples for each bin, and storing each of the samples;
   c. performing additional integration scans and accumulating the samples for each bin to create accumulated bin values for each bin;
   d. averaging the accumulated bin values for each bin after a predetermined number of integration scans have been completed; and
   e. evaluating the averaged bin values from step d) to determine whether a CW signal is present within a bin.

8. A method as defined by claim 7, wherein the compressive receiver is further defined having a sweep time, the sweep time being the time required to sweep the bandwidth of the compressive receiver, and wherein the sampling of step b) comprises sampling one of the plurality of bins per sweep time of the compressive receiver.

9. A method as defined by claim 7, wherein the compressive receiver is further defined having a sweep time, the sweep time being the time required to sweep the bandwidth of the compressive receiver, and wherein step b) is completed within a time period equal to one sweep time of the compressive receiver.

10. A method as defined by claim 7, wherein the compressive receiver is further defined having a sweep time, the sweep time being the time required to sweep the bandwidth of the compressive receiver, and wherein step b) is completed within a time period being an integer multiple of the sweep time of the compressive receiver, the integer multiple being less than B.

* * * * *